United States Patent [19]

Gusching et al.

[11] 4,300,418
[45] Nov. 17, 1981

[54] TOOL TURRET MECHANISM

[75] Inventors: Nagle V. Gusching, Sidney; Ted R. Wagner, New Bremen, both of Ohio

[73] Assignee: The Monarch Machine Tool Company, Sidney, Ohio

[21] Appl. No.: 98,291

[22] Filed: Nov. 28, 1979

[51] Int. Cl.$^3$ .............................................. B23B 29/00
[52] U.S. Cl. ..................................................... 82/36 A
[58] Field of Search .............................. 82/36 A, 36 R

[56] References Cited

U.S. PATENT DOCUMENTS

| | | | |
|---|---|---|---|
| 3,798,721 | 3/1974 | Schalles | 82/36 A |
| 4,006,518 | 2/1977 | Rudolph et al. | 82/36 A |
| 4,051,750 | 10/1977 | Berly | 82/36 A |
| 4,055,095 | 10/1977 | Gramespacher et al. | 82/36 A |
| 4,180,894 | 1/1980 | Link | 82/36 A |
| 4,218,816 | 8/1980 | Dormehl | 82/36 A |

FOREIGN PATENT DOCUMENTS 2534201 2/1977 Fed. Rep. of Germany ..... 82/36 A

*Primary Examiner*—Harrison L. Hinson
*Attorney, Agent, or Firm*—Pearne, Gordon, Sessions, McCoy & Granger

[57] ABSTRACT

A tool turret mechanism is for use with a machine tool having a rotatable workpiece spindle. The axis of the turret is at a small acute angle to the axis of the workpiece spindle for tool clearance and the turret has first and second surface portions mounting first and second pluralities of OD turning tools and ID turning tools, respectively. The two pluralities of tool mounting surfaces are generally in the same plane. The plurality of OD turning tool mounting surfaces is in a plane which intersects the ID tool mounting surfaces. The turret is asymmetric in that the spacing angles between the OD turning tool mounting surfaces are less than the spacing angles between the ID turning tool mounting surfaces, thereby permitting a greater number of tools to be mounted on a given size turret, and giving greater flexibility in permitting first given numbers of OD and ID tools or, alternatively, a greater number of OD turning tools and a lesser number of ID turning tools. The foregoing abstract is merely a resume of one general application, is not a complete discussion of all principles of operation or applications, and is not to be construed as a limitation on the scope of the claimed subject matter.

15 Claims, 6 Drawing Figures

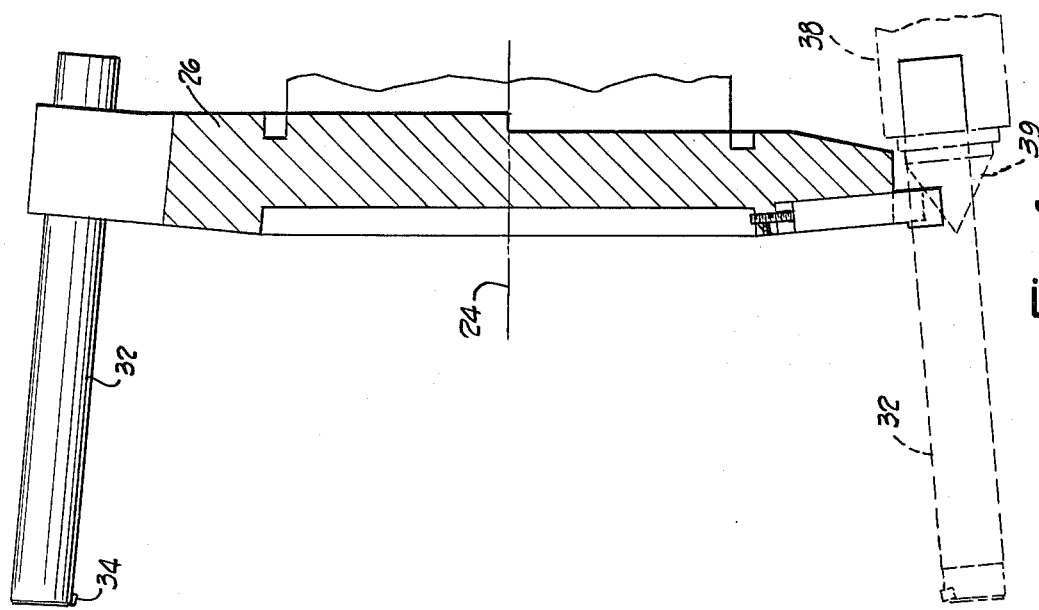
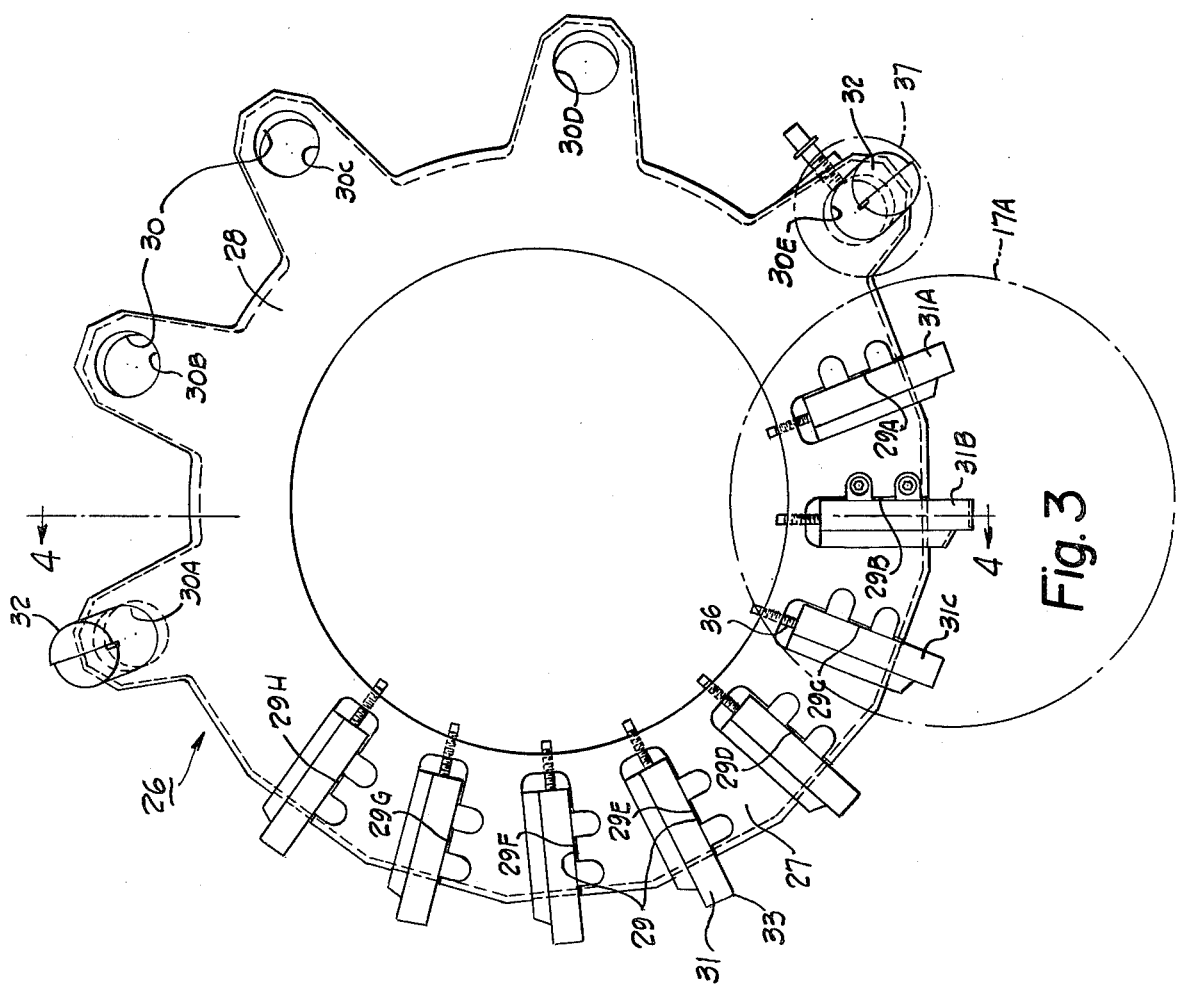

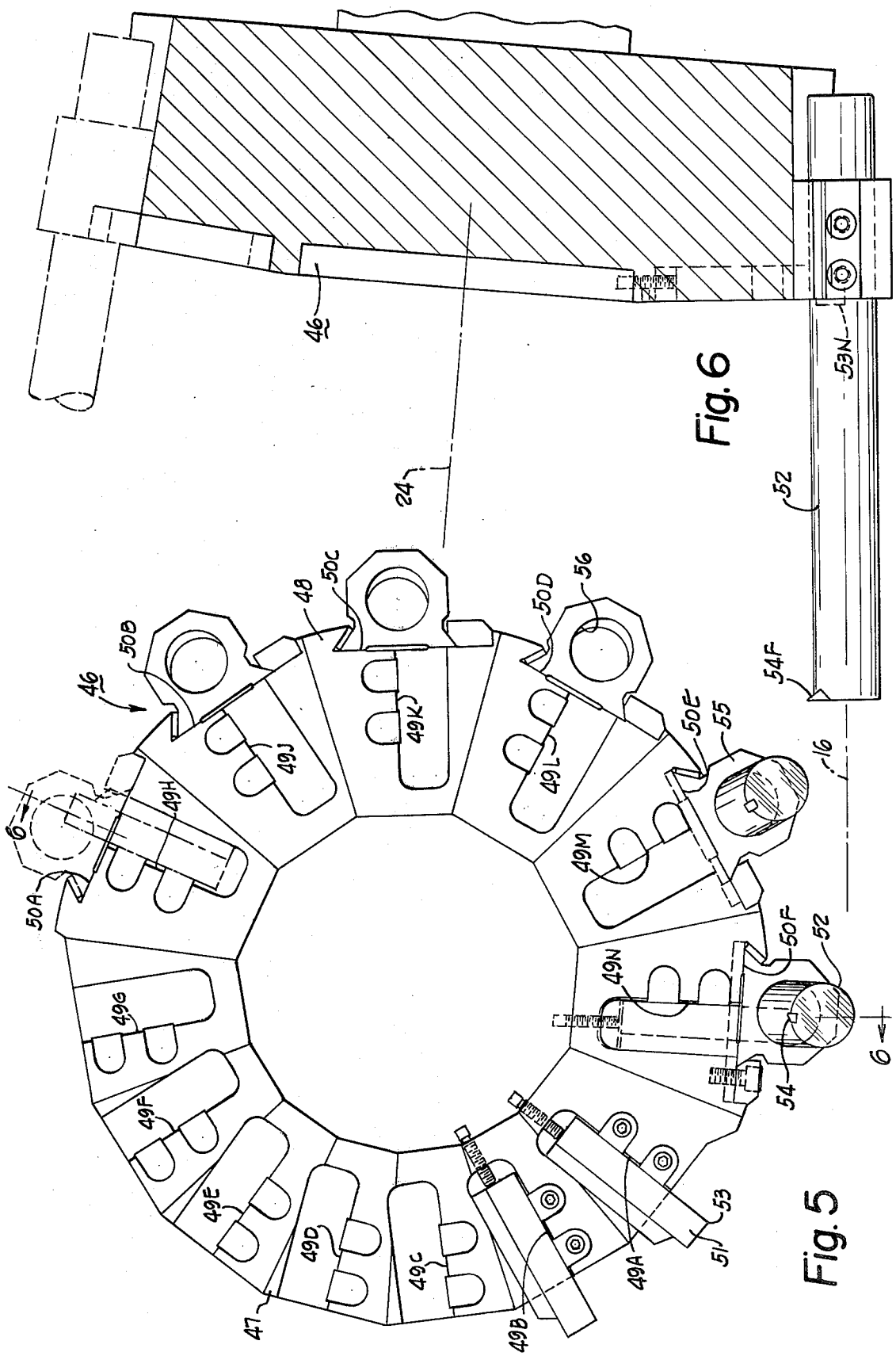

TOOL TURRET MECHANISM

BACKGROUND OF THE INVENTION

Tool turrets have previously been proposed including tool turrets which would carry both OD and ID turning tools. In U.S. Pat. No. 3,786,539 it was suggested to have a single slide carrying two separate turrets, one having OD tools and the other having ID tools, and since they were on the same slide, the two turrets could be used only alternatively. Also, the use of tools in one turret often meant that the tools in the other turret might interfere with other parts of the machine tool.

U.S. Pat. No. 946,924 suggested the use of a single turret which could hold both OD turning tools and ID turning tools at different longitudinal dimensions along the single turret.

U.S. Pat. No. Re. 29,694 suggested the use of a compound slide mounting a single turret which had two levels along the axis of the turret, with the first level carrying OD turning tools and the second level carrying ID turning tools. Only a single tool at a single level could be used at one time, and again it was often difficult to avoid having a tool at one level interfere with use of a tool at the other level.

U.S. Pat. No. 3,835,516 had a single turret mounted on a compound slide, and on the periphery of the turret there were mounting surfaces which would accommodate either OD or ID turning tools.

Another tool turret proposal was one which was generally a flat disc with OD turning tools mounted generally radially thereon and alternating with these OD tool mounts were ID tool mounting surfaces, with all tool mounting surfaces being uniformly spaced. A somewhat similar tool turret mechanism again was a generally disc-shaped turret with generally radially disposed OD tool mounting surfaces. At one section of the periphery, ID tool mounting surfaces alternated with the OD tool mounting surfaces and at another section of the periphery the OD tool mounting surfaces were adjacent to each other and at a slightly closer spacing than the OD tool mounting spaces in the first-mentioned section.

SUMMARY OF THE INVENTION

The problem to be solved then is how to construct a tool turret mechanism which has greater flexibility of use in choice of using OD or ID tools without interference and wherein the user may select a given number of OD tools and a given number of ID tools or, alternatively, may select a larger number of OD turning tools and a smaller number of ID turning tools. This problem is solved by a machine tool having a rotatable workpiece spindle with an axis, a turret mechanism comprising, in combination, a turret, means mounting said turret for rotation about an axis, said turret having first and second different peripheral surface portions, a first plurality of adjacent OD turning tool mounting surfaces on said first surface portion, a second plurality of adjacent ID turning tool mounting surfaces on said second surface portion, one of said plurality of tool mounting surfaces being in a plane intersecting the other of said plurality of tool mounting surfaces, and said second plurality of tool mounting surfaces being disposed with spacing angles therebetween greater than that between said first plurality of tool mounting surfaces.

An object of the invention is to provide an asymmetrical tool turret mechanism.

Another object of the invention is to provide a tool turret mechanism with OD turning tools spaced more closely together than the ID turning tools for greater utilization of the space on the periphery of the tool turret.

Another object of the invention is to provide a tool turret mechanism which offers greater flexibility in selection of number and type of tools to the user of the machine tool.

Other objects and a fuller understanding of the invention may be had by referring to the following description and claims, taken in conjunction with the accompanying drawings.

BRIEF DESCRIPTION OF THE DRAWINGS

FIG. 3 is a front view of the tool turret mechanism of the invention;

FIG. 4 is a sectional view on line 4—4 of FIG. 3;

FIG. 5 is a front view of a modified tool turret mechanism; and

FIG. 6 is a sectional view on line 6—6 of FIG. 5.

DESCRIPTION OF THE PREFERRED EMBODIMENTS

Figure 1:
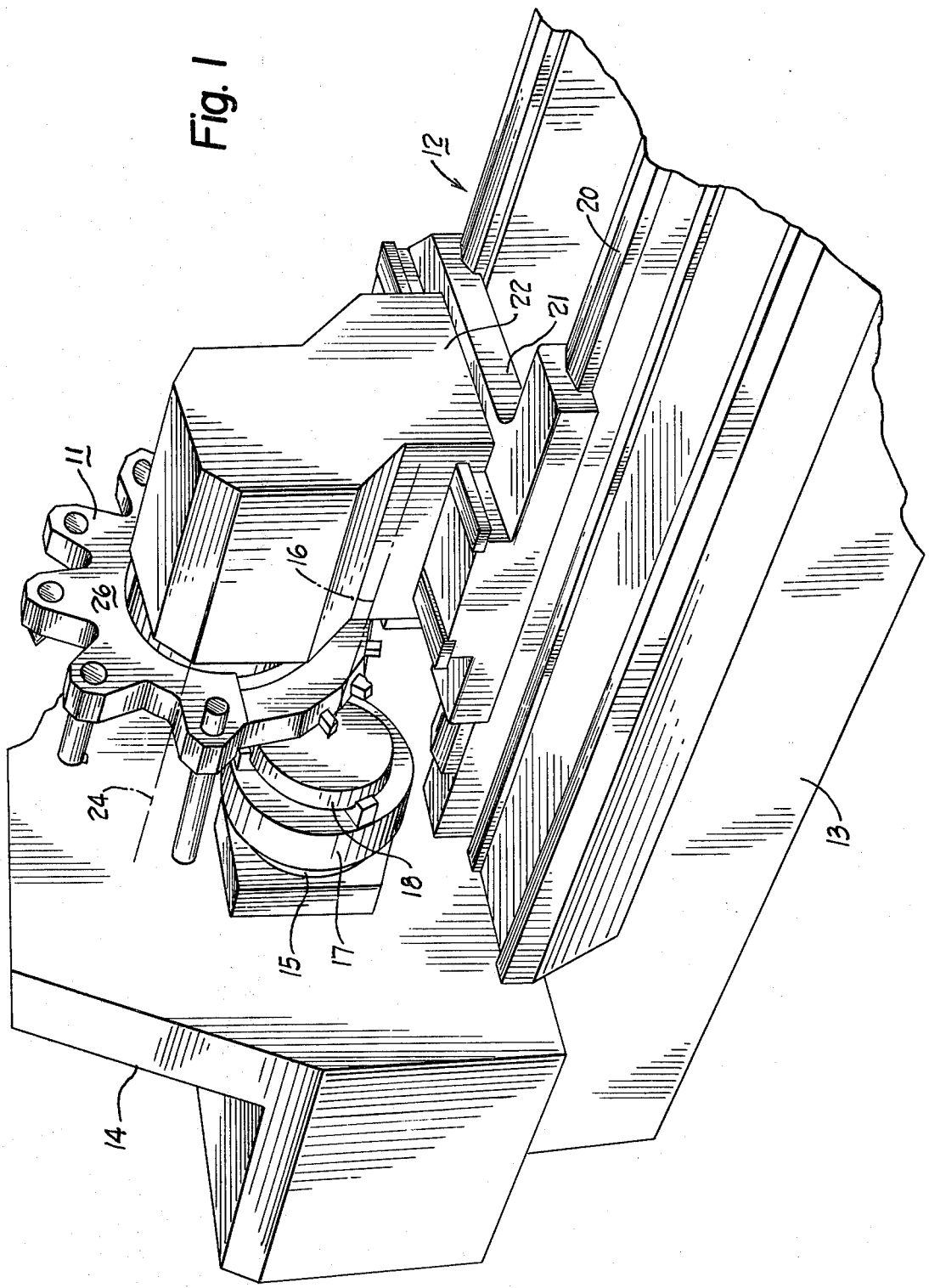
FIG. 1 is a perspective view of a lathe incorporating the tool turret mechanism of the invention.
Figure 2:
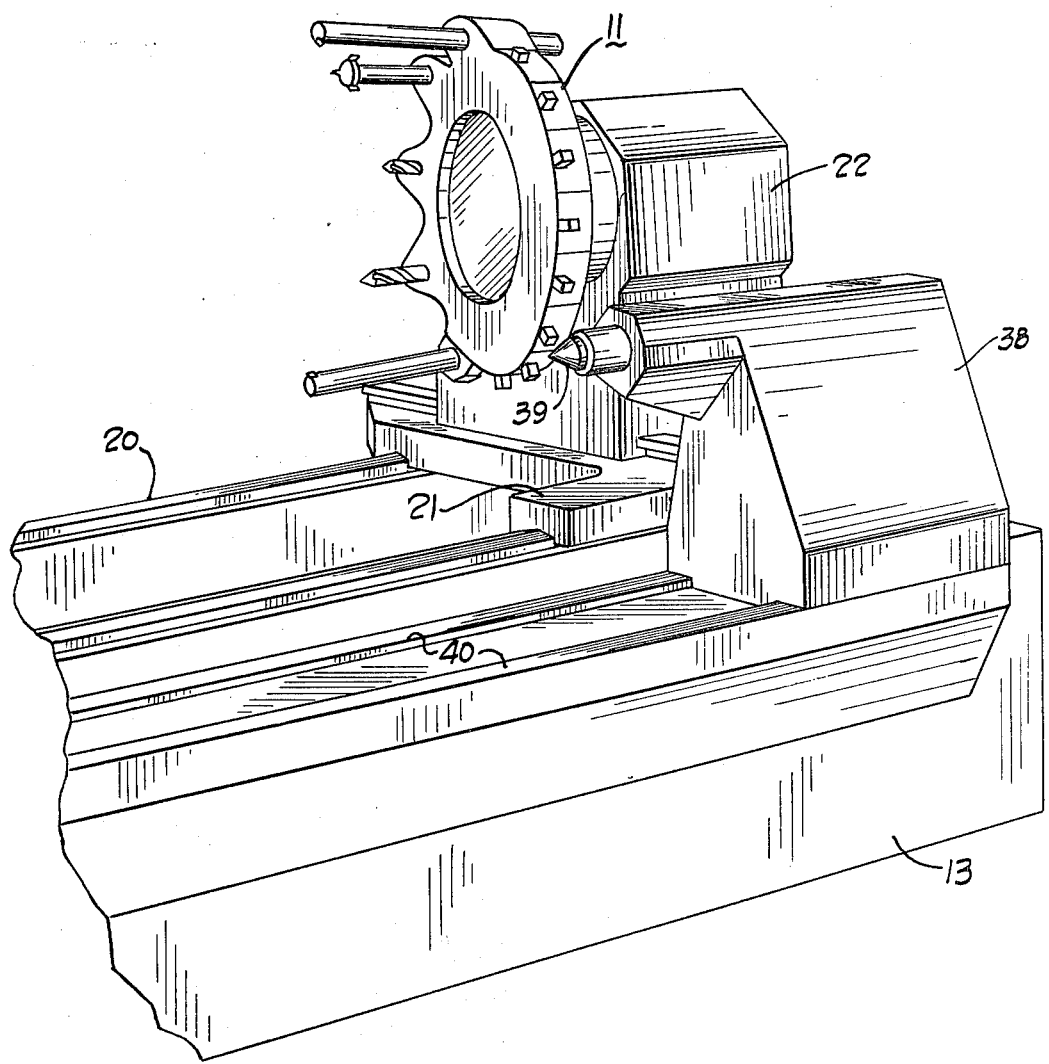
FIG. 2 is another perspective view of the lathe with the turret in a different position.

FIGS. 1 and 2 illustrate a tool turret mechanism 11 which is shown mounted on a lathe 12 having a base 13 which carries a headstock 14 having a spindle 15 rotatable about an axis 16. The spindle mounts some form of work holder, such as a collet for bar stock, or, as shown, a chuck 17 for gripping a workpiece 18. The base further has ways 20 on which a carriage 21 is longitudinally slidable and on which a cross slide 22 is transversely slidable. This cross slide 22 mounts the tool turret mechanism 11 for rotation about a turret axis 24, which may be parallel to the spindle axis 16 but preferably is at a small acute angle relative to this axis.

The turret mechanism 11 includes a tool turret 26 which is rotatable about the turret axis 24 by a mechanism not shown. The turret 26 is constructed in the form of a flat plate with first and second different peripheral surface portions 27 and 28, respectively. A first plurality of adjacent OD turning tool mounting surfaces 29 are provided on the first surface portion 27, and a second plurality of adjacent ID turning tool mounting surfaces 30 are provided on the second surface portion 28. The OD tool mounting surfaces are generally radially disposed pockets to receive OD turning tools 31. The term "OD tools" includes facing tools to face along the longitudinal end of the workpiece 18, as well as to cut on the outer circumference of such workpiece. Such OD tools have cutting tips 33. The ID tool mounting surfaces 30 are shown as generally longitudinally disposed sockets to receive ID tools 32, such as drills and boring bars, or even such things as bar pullers to pull bar stock longitudinally through the hollow spindle 17. Such ID tools 32 have cutting tool tips 34. Adjusting screws 36 bear against the inner end of the OD tools 31 to adjust the radial position of the OD tool tips 33.

One feature of the present invention is that the OD tools 31 lie in a plane normal to the turret axis 24 and which plane intersects the ID tool mounting surfaces 30.

A feature of the present invention is that all of the OD tools 31 are adjacent to each other on the first surface portion 27, and that all of the ID tools 32 are adjacent to each other on the second surface portion 28. Another feature of the invention is that the OD tool mounting surfaces 29 are spaced closer together than the ID tool mounting surfaces 30. This permits mounting a greater number of OD tools 31 on the same diameter turret compared with the prior art practice. In FIG. 3, it will be noted that the OD tools 31A-H have an angular spacing of 21 degrees, the ID tool sockets 30A, 30B, and 30C have a spacing of 36 degrees, and the tool mounting sockets 30D and 30E have a spacing of 42 degrees. This latter greater angular spacing permits mounting large tools or bar pullers 37 in the tool sockets 30D, 30E, or 30F to minimize interference with the workpiece 18 or other parts of the lathe 12. The asymmetric spacing of the various tool holding surfaces permits greater tool turret utilization and gives greater flexibility to the user of the lathe 12.

Another feature of the invention is to permit use of a given number of OD tools 31, e.g., seven, in sockets 29B to 29H, together with a given number of ID tools, e.g., five, in the sockets 30A-30E; or, alternatively, the use of a greater number of OD tools 31, e.g., eight, in the pockets 29A-29H, and a smaller number of ID tools, e.g., four, in the sockets 30A-30D. As shown by the dotted circle 17A, using the tip of tool 31B as a center, it will be noted that such tool 31B can cut to the axis 16 of the spindle 15, for example, on a facing cut, and can accomplish this without interference between any other tool and the workpiece 18 (see also FIG. 1). However, an OD tool 31A in the pocket 29A has limited usefulness with a tool such as a boring bar mounted in the socket 30E. Such tool 31A cannot cut to the center of the workpiece because the tool in socket 30E would collide with the chuck 17.

The reason why the tool 31B can cut to the spindle axis 16 is that the adjacent tools 31A and 31C are longitudinally displaced farther from the workpiece than the tool 31B because of the small acute angle between the spindle axis 16 and the turret axis 24. This may be observed in FIG. 4.

The superposition of the chuck circle 17A on FIG. 3 illustrates that even if the tool 31B cuts to the spindle centerline, there is no interference with ID cutting tools in the socket 30E, or even with large diameter tools such as the bar puller 37.

The turret mechanism 11 is one which permits small incremental positioning of the turret 26. This might be in one-degree, two-degree, or three-degree increments such as established by a curvic coupling. In the embodiment shown in FIGS. 1-4, such incremental positioning need be only in three-degree increments because of the 21-degree, 36-degree, and 42-degree spacing of the various tool mounting surfaces. It will be noted that if all tool mounting surfaces were established on a 36-degree spacing, then only ten tool mounting surfaces could be provided around the periphery of the turret. With the asymmetric turret shown in FIGS. 1-4, there are a total of twelve fully utilizable tool mounting surfaces, namely, seven OD tool mounting surfaces and five ID tool mounting surfaces, which may be utilized at all times. The thirteenth tool mounting surface 31A may be utilized as an additional OD tool mounting surface when the ID tool mounting surface 30E is not being used for a particular production job.

The lathe 12 may incorporate a tailstock 38 having a tail center 39, and with the tailstock 38 movable on ways 40 parallel to the spindle axis 16. FIG. 2 illustrates how the tools, especially the OD tools 31, may cut on a workpiece 18 which is not shown but which would be centered on the tail center 39, and cut very closely adjacent to this tail center 39 without interference with the tailstock 38.

FIGS. 5 and 6 illustrate a modified tool turret 46 which may be used on the machine tool 12 and may replace the tool turret 26. This tool turret 46 has first and second peripheral surface portions 47 and 48 which provide OD and ID tool mounting surfaces 49 and 50, respectively. The first peripheral surface portion in this embodiment exceeds 180 degrees of arc and, as shown, includes the entire 360-degree periphery of the face of the turret 46. In this embodiment, there are 13 of these OD tool mounting surfaces 49, with the reference numerals 49A through 49H and 49J through 49N. The second peripheral surface portion 48 may include any selected arc of the tool turret 46 and, as shown, this is slightly less than 180 degrees of arc to provide the ID tool mounting surfaces 50. These are shown as six in number, with reference numerals 50A through 50F inclusive. The OD tool mounting surfaces 49 are adapted to mount OD tools 51 and the ID tool mounting surfaces 50 are adapted to mount ID tools 52, the OD tools having tool tips 53 and the ID tools having tool tips 54. The ID tools 52 are mounted in removable tool holders 55 which provide sockets 56 in which the actual ID tools 52 are mounted. These removable tool holders 55 provide added versatility to the tool turret 46.

The tool turret 46 has the same two features as provided by the tool turret 26, but in a slightly different configuration. The first feature is the asymmetric disposal of the tool mounting surfaces 49 and 50. The OD tool mounting surfaces 49A through 49G have a spacing relative to the adjoining tool mounting surface of 22 degrees. The spacing between the centerlines of the adjacent ID tool mounting surfaces 50A through 50F is 32 degrees, and the spacing between the adjacent OD tool mounting surfaces 49G and 49H and between 49A and 49N is 34 degrees, for a total of 360 degrees of the periphery on which the OD tools 51 may be mounted. Thirteen such OD tools may be mounted, one in each pocket or OD tool mounting surface 49. Alternatively, where some OD and some ID tools are required for a particular production job, then seven OD tools 51 may be mounted in the tool mounting pockets 49A through 49G, and six ID tools 52 may be mounted in the ID tool mounting surfaces 50A through 50F. In such case, there will be ample space between each of the ID tools, so that an ID tool may be working inside the workpiece 18 and the two adjacent ID tools will straddle the chuck 17. Alternatively, when an OD tool is in cutting position, then the adjacent OD or ID tools will also be in a non-interfering position with the chuck and workpiece. Again, because of the small acute angle between the turret axis 24 and spindle axis 16, OD tools adjacent to the OD tool which is being used will be longitudinally spaced a few-thousandths of an inch farther away from the workpiece than the tool in use; hence, such tool may cut to the spindle centerline 16.

The OD tool mounting surfaces 49 are disposed in a plane normal to the turret axis 24, and this plane intersects the ID tool mounting surfaces 50. It will be noted that if all tool mounting surfaces were at the 32-degree spacing of the ID tool mounting surfaces 50A–50F, then only 11 tool mounting surfaces could be provided around the periphery. As shown, however, there are 13 tool mounting surfaces for the OD tools 51 around the periphery of the turret 46 for a much greater utilization of the peripheral mounting surface of such turret.

The first and second peripheral surface portions 27 and 28 and 47 and 48 are at least partially overlapping, and this precludes the possibility of mounting tools in all of the tool mounting surfaces. Nevertheless, this provides greater flexibility to the user so that he may select a greater or lesser number of either the OD or ID tools to be used on a particular production job.

Again, in FIGS. 5 and 6, it will be noted that the dimension from the ID tool centerline to the turret axis 24 is the same as the dimension from the turret axis 24 to the tool tip 53N of an OD tool 51 in the tool mounting surface 49N, if an OD tool is used in that pocket. This is a convenience toward easy programming of the lathe 12 for numerical control.

The turrets 26 and 46 have flexibility in choice of numbers of OD and ID tools to be used. Considering the turret 26, for example, the arc subtended by the OD tool mounting surfaces 29 (147°) plus the arc subtended by the ID tool mounting surfaces 30 (156°) plus the arc 42 subtended by the maximum diameter of chuck 17 at the radius of the said ID tool mounting surfaces (65°) exceeds 360°. This precludes cutting to the workpiece centerline by a tool in each of the tool mounting surfaces in connection with a maximum diameter chuck.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a machine tool having a rotatable workpiece spindle with an axis, a turret mechanism comprising, in combination,
    a turret,
    means mounting said turret for rotation about an axis,
    said turret having first and second different peripheral surface portions unitary with said turret,
    a first plurality of adjacent OD turning tool mounting surfaces on said first surface portion,
    a second plurality of adjacent ID turning tool mounting surfaces on said second surface portion,
    one of said plurality of tool mounting surfaces being in a plane intersecting the other of said plurality of tool mounting surfaces,
    and said second plurality of tool mounting surfaces being disposed with spacing angles therebetween greater than that between said first plurality of tool mounting surfaces, said first and second surface portions being constituted by first and second contiguous arcs together encompassing substantially 360° of the periphery of said turret.

2. A turret mechanism as set forth in claim 1, including means providing relative longitudinal and transverse movement between said turret and the workpiece spindle.

3. A turret mechanism as set forth in claim 1, including a first slide and a second slide carried thereon,
    means mounting said turret on said second slide,
    and said slides providing longitudinal and transverse movement of said turret relative to the workpiece spindle.

4. A turret mechanism as set forth in claim 1, wherein said first and second pluralities of tool mounting surfaces are substantially perpendicular to each other.

5. A turret mechanism as set forth in claim 1, wherein said OD and ID tool mounting surfaces are adapted to hold OD tools and ID tools, respectively, and all having cutting tips,
    and said OD and ID tool mounting surfaces being disposed on said turret in positions such that the cutting tip-to-turret axis dimension for the OD tools is substantially equal to the centerline-to-turret axis dimension for the ID tools.

6. A turret mechanism as set forth in claim 1, wherein said two arcs are at least partially overlapping to preclude the possibility of mounting tools in all of said tool mounting surfaces.

7. A turret mechanism as set forth in claim 1, wherein said OD and ID tool mounting surfaces overlap at least to a small extent on said turret.

8. A turret mechanism for a machine tool having a rotatable spindle with an axis and with a given maximum diameter of workpiece holder,
    said turret mechanism including a turret mounted for rotation about an axis and with first and second different peripheral surface portions.
    a first plurality of adjacent OD turning tool mounting surfaces on said first surface portion and a second plurality of adjacent ID turning tool mounting surfaces on said second surface portion,
    characterized in that one of said tool mounting surfaces lies in a plane intersecting the other of said tool mounting surfaces,
    said first and second different surface portions being unitary with said turret and at different arcuate positions on said turret,
    and said second plurality of tool mounting surfaces being disposed with spacing angles therebetween greater than that between said first plurality of tool mounting surfaces.

9. A turret mechanism as set forth in claim 8, wherein at least one of said OD tool mounting surfaces is positioned on said turret at a location such that an OD tool mounted thereon has a tool cutting tip at substantially the same peripheral location as an ID tool mounted on the corresponding ID tool mounting surface.

10. A turret mechanism as set forth in claim 8, wherein each of said OD and ID tool mounting surfaces is positioned on said turret at locations such that each OD tool mounted on the respective OD tool mounting surface and each ID tool mounted on the respective ID tool mounting surface has a cutting tool tip at approximately the same distance from the turret axis.

11. A turret mechanism as set forth in claim 8, wherein said turret axis is at a small acute angle relative to said spindle axis to establish the cutting tip of an OD tool in an OD tool mounting surface to be at substantially the same radial distance from said turret axis as the centerline of a boring bar ID toolholder at the respective tool mounting surface and at substantially the same radial distance from said turret axis as the cutting tip of the boring bar ID tool.

12. A turret mechanism as set forth in claim 8, wherein the arc subtended by all of said OD tool mounting surfaces plus the arc subtended by all of said ID tool mounting surfaces plus the arc subtended by said maximum workholder diameter at the radius of said ID tool mounting surfaces exceeds 360° to preclude cutting to the workpiece centerline by a tool in each of said tool mounting surfaces in connection with a maximum diameter workholder.

13. A turret mechanism as set forth in claim 12, wherein said tool mounting surfaces permit mounting of a given number of OD tools and a given number of ID tools or alternatively a lesser number of OD tools and a greater number of ID tools.

14. A turret mechanism as set forth in claim 8, wherein said ID tool holders are unitary with said turret.

15. A turret mechanism as set forth in claim 8, including removable ID tool holders mountable at said ID tool mounting surfaces.

* * * * *